(12) United States Patent
Larosa et al.

(10) Patent No.: US 10,651,691 B2
(45) Date of Patent: May 12, 2020

(54) METHOD OF OPERATING RADIO-FREQUENCY POWERED DEVICES, CORRESPONDING CIRCUIT AND DEVICE

(71) Applicant: STMicroelectronics S.r.l., Agrate Brianza (MB) (IT)

(72) Inventors: Roberto Larosa, Viagrande (IT); Giulio Zoppi, Palermo (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 100 days.

(21) Appl. No.: 15/975,347

(22) Filed: May 9, 2018

(65) Prior Publication Data
US 2018/0331580 A1 Nov. 15, 2018

(30) Foreign Application Priority Data
May 10, 2017 (IT) .................. 102017000050638

(51) Int. Cl.
| | |
|---|---|
| *H02J 50/20* | (2016.01) |
| *G06K 19/07* | (2006.01) |
| *H02J 4/00* | (2006.01) |
| *G08C 17/02* | (2006.01) |

(52) U.S. Cl.
CPC .......... *H02J 50/20* (2016.02); *G06K 19/0707* (2013.01); *G06K 19/0708* (2013.01); *G06K 19/0723* (2013.01); *H02J 4/00* (2013.01); *G08C 17/02* (2013.01); *G08C 2201/12* (2013.01)

(58) Field of Classification Search
CPC ........ H02J 50/20; H02J 4/00; G06K 19/0707; G06K 19/0723; G06K 19/0708; G08C 17/02; G08C 2201/12
See application file for complete search history.

(56) References Cited

U.S. PATENT DOCUMENTS

| | | | |
|---|---|---|---|
| 6,480,699 B1 | 11/2002 | Lovoi | |
| 6,857,079 B2 * | 2/2005 | Chen ..................... | G06F 1/3228 327/108 |
| 7,400,253 B2 * | 7/2008 | Cohen ................ | G06K 19/0707 235/383 |
| 7,588,098 B2 * | 9/2009 | Nakazawa .............. | B25B 21/00 173/176 |

(Continued)

FOREIGN PATENT DOCUMENTS

WO 2010061317 A1 6/2010

OTHER PUBLICATIONS

IT Search Report and Written Opinion for IT Appl. No. 2017000050638 dated Dec. 12, 2017 (9 pages).

(Continued)

*Primary Examiner* — Pinping Sun
(74) *Attorney, Agent, or Firm* — Crowe & Dunlevy

(57) ABSTRACT

Radiofrequency energy that is captured by a radiofrequency power harvester is stored in a storage capacitance. One or more user circuits are supplied with energy stored in the storage capacitance. The harvester operates in alternated charge and burst phases with captured radiofrequency energy stored in the storage capacitance in the charge phases and supplied to the user circuits in the burst phases to perform user circuit tasks. In response to detection of completion of the user circuit tasks in a burst phase, the harvester causes operation to shift to the next charge phase.

9 Claims, 3 Drawing Sheets

(56) References Cited

U.S. PATENT DOCUMENTS

| | | | | |
|---|---|---|---|---|
| 7,944,086 | B2* | 5/2011 | Hodges | H02H 3/12 307/126 |
| 8,553,431 | B2* | 10/2013 | Zheng | H02M 3/33507 363/21.12 |
| 9,030,165 | B2* | 5/2015 | Kawai | B60R 16/033 320/109 |
| 9,362,779 | B2* | 6/2016 | Takahashi | H01M 10/44 |
| 2005/0093374 | A1* | 5/2005 | Connors | G06K 19/0705 307/126 |
| 2008/0055092 | A1* | 3/2008 | Burr | G06K 19/0707 340/572.7 |
| 2008/0100423 | A1* | 5/2008 | Geissler | G06K 19/0707 340/10.1 |
| 2008/0252478 | A1* | 10/2008 | Katsuyama | G08C 17/02 340/4.3 |
| 2008/0290822 | A1* | 11/2008 | Greene | H05B 33/0803 315/363 |
| 2011/0285514 | A1* | 11/2011 | Feng | G08C 17/02 340/12.5 |
| 2013/0033235 | A1* | 2/2013 | Fukaya | H02J 50/40 320/162 |
| 2014/0354235 | A1* | 12/2014 | Chauhdary | B60L 53/12 320/128 |
| 2016/0110572 | A1* | 4/2016 | Kalhous | G06K 19/0708 340/10.1 |
| 2016/0352231 | A1* | 12/2016 | Quigley | H02M 3/33507 |

OTHER PUBLICATIONS

Sample A P et al: "Design of an RFID-Based Battery-Free Programmable Sensing Platform", IEEE Transactions on Instrumentation and Measurement, IEEE Service Center, Piscataway, NJ, US, vol. 55, No. 11, Nov. 1, 2008, pp. 2608-2615, XP011227802.

J.R. Smith, et al.: "A Wirelessly-Powered Platform for Sensing and Computation", 8th International Conference, UbiComp 2006 Orange County, CA, USA, Sep. 17-21, 2006 Proceedings—P. Dourish and A. Friday (Eds.) pp. 495-506, 2006.

T. Paing, et al.: "Wirelessly-powered wireless sensor platform", 2007 European Microwave Conference, Oct. 9-12, 2007 (ISBN: 978-2-87487-001-9, IEEE Xplore: Dec. 17, 2007).

Yi Zhao, et al., "NFC-WISP: A Sensing and Computationally Enhanced Near-Field RFID Platform," 2015 IEEE Int. Conf. on RFID, 2015, pp. 174-181.

* cited by examiner

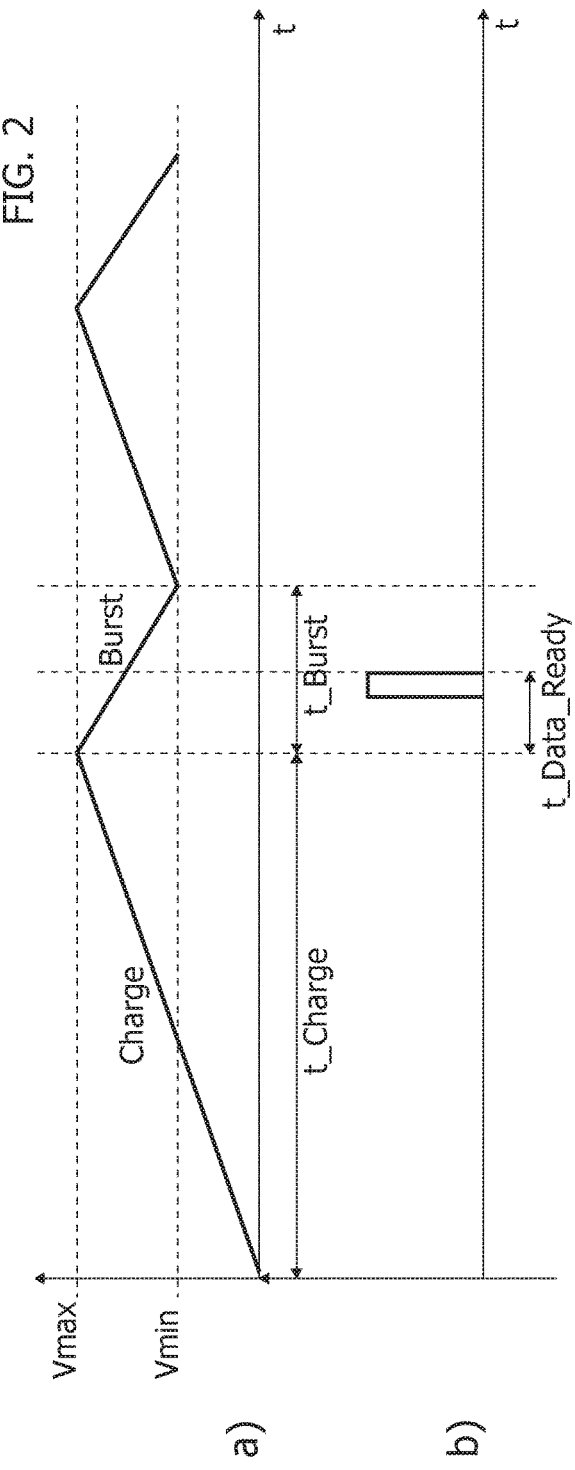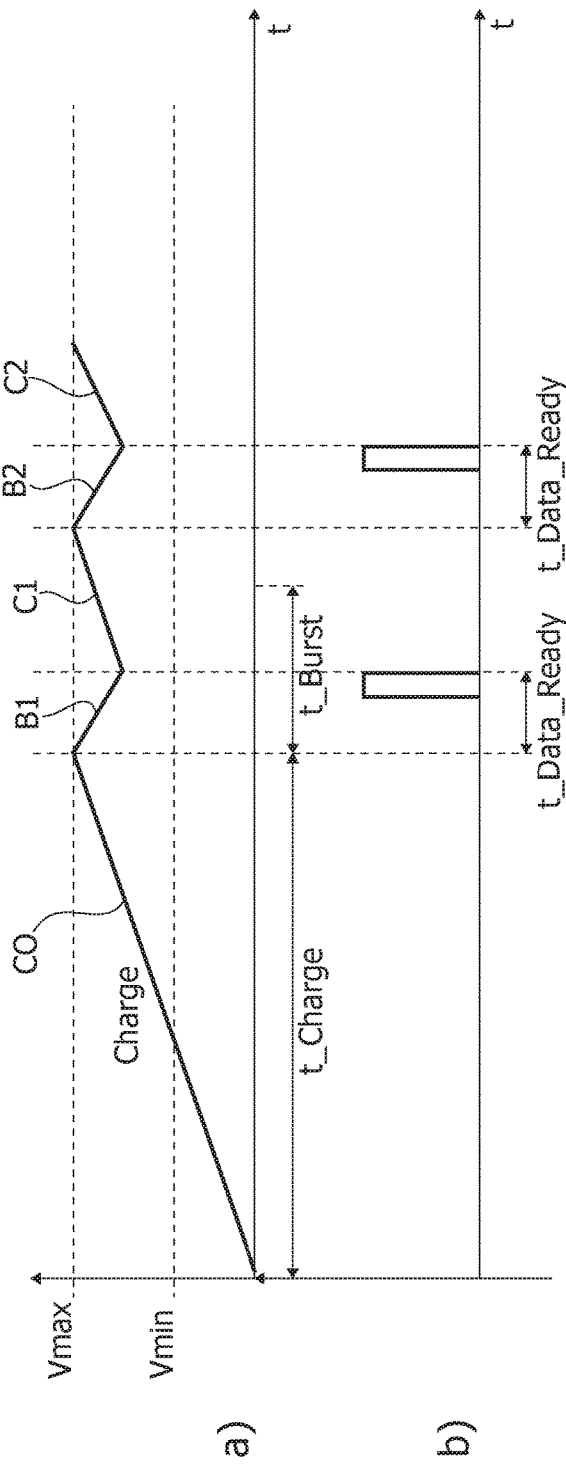

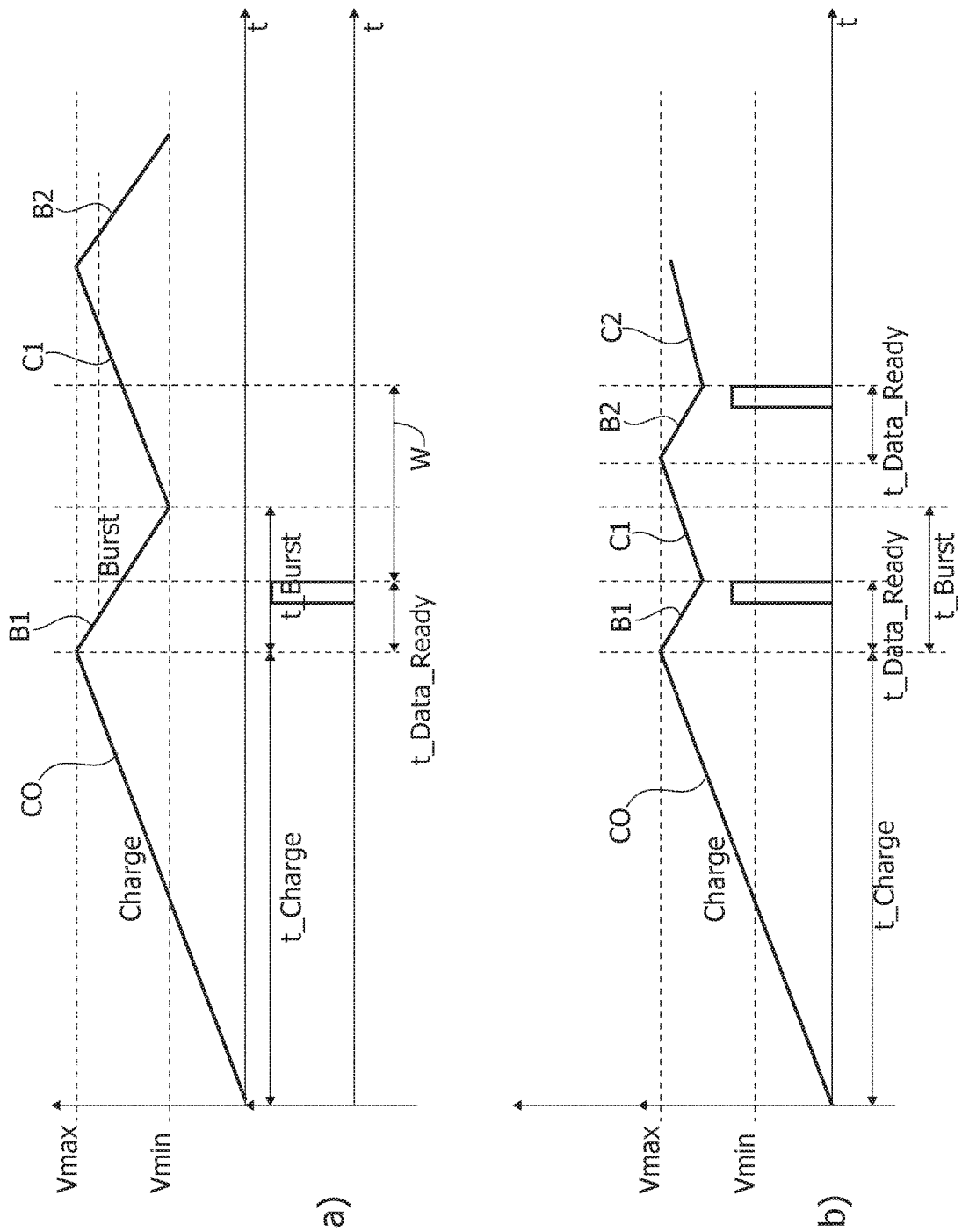

METHOD OF OPERATING RADIO-FREQUENCY POWERED DEVICES, CORRESPONDING CIRCUIT AND DEVICE

PRIORITY CLAIM

This application claims the priority benefit of Italian Application for Patent No. 102017000050638, filed on May 10, 2017, the disclosure of which is hereby incorporated by reference in its entirety to the maximum extent allowable by law.

TECHNICAL FIELD

The description relates to radio-frequency (RF) powered devices.

One or more embodiments may be applied to battery-free sensor nodes powered by means of an external radio frequency power source.

BACKGROUND

Wireless battery-free sensor nodes for use for example in wireless sensor networks (WSNs) are good candidates for extensive use in various applications such as IoT (Internet of Things) applications.

Wirelessly-powered devices have formed the subject matter of extensive research as witnessed for example by:
- T. Paing, et al.: "Wirelessly-powered wireless sensor platform", 2007 European Microwave Conference, 9-12 Oct. 2007 (ISBN: 978-2-87487-001-9, IEEE Xplore: 17 Dec. 2007), incorporated by reference; and
- J. R. Smith, et al.: "A Wirelessly-Powered Platform for Sensing and Computation", 8th International Conference, UbiComp 2006 Orange County, Calif., USA, Sep. 17-21, 2006 Proceedings—P. Dourish and A. Friday (Eds.) pp. 495-506, 2006, incorporated by reference.

Despite the intensive activity in that area, further improvements are still desirable in respect of factors such as robustness and efficiency, with emphasis placed on arrangements where radio frequency power is harvested with the technique known as "Charge-and-Burst".

For instance, a drawback of for example wirelessly-powered sensors adopting that approach may lie in the timing involved in performing multiple acquisitions.

SUMMARY

One or more embodiments may relate to a corresponding circuit as well as to corresponding device as for example a battery-free sensor node for use in contexts as discussed in the foregoing.

One or more embodiments may provide a battery-free platform (for example a sensor platform) with improved performance (for example acquisition and communication capability).

One or more embodiments may avoid battery replacement (in those solutions where a standard battery is present to co-operate with the harvester circuit).

One or more embodiments may facilitate the use of low-maintenance technology.

One or more embodiments may be applied to devices such as wireless identification and sensing platforms (WISPs) adapted to be powered "wirelessly" (that is by radiofrequency waves) thus possibly dispensing with the use of batteries.

One or more embodiments may provide improvements in power management during the charge and burst phase of power transfer.

One or more embodiments may permit a higher number of tasks (for example acquisition tasks) to be performed in a same time window.

One or more embodiments may permit improving acquisition rates by an order of a magnitude (for instance one second in comparison to ten seconds in conventional arrangements).

In one or more embodiments, less power can be used for a same amount of tasks (for example acquisitions) thus improving energy efficiency.

One or more embodiments may pave the way to no-maintenance battery-free technology solutions.

In an embodiment, a method comprises: providing a radiofrequency power harvester storing captured radiofrequency energy (power integrated over time) in a storage capacitance with at least one user circuit supplied with energy stored in the storage capacitance, operating the harvester in alternated charge phases and burst phases with captured radiofrequency energy stored in the storage capacitance in the charge phases and energy stored in the storage capacitance supplied to the at least one user circuit in the burst phases to perform user circuit tasks, detecting completion of the user circuit tasks in the burst phases, terminating the burst phases and alternating therefore charge phases as a result of completion of the user circuit tasks detected.

One or more embodiments may include:
the at least one user circuit issuing task completion signals as a result of completion of the user circuit tasks, and
switching operation of the radiofrequency harvester from burst phase operation to charge phase operation as a result of the user circuit task completion signals being issued.

In an embodiment, a circuit comprises: a radiofrequency power harvester including a storage capacitance of radiofrequency energy captured by the radiofrequency power harvester, the storage capacitance couplable with at least one user circuit to supply thereto energy stored in the storage capacitance, wherein: the harvester is operable in alternated charge phases and burst phases to store captured radiofrequency energy in the storage capacitance in the charge phases and supply energy stored in the storage capacitance to the at least one user circuit in the burst phases to perform user circuit tasks, the harvester is sensitive to completion of the user circuit tasks in the burst phases and configured to terminate the burst phases and alternate therefore charge phases as a result of completion of the user circuit tasks.

In one or more embodiments, a device may include:
a circuit according to one or more embodiments,
at least one user circuit couplable to the storage capacitance in the burst phases to be supplied with energy stored in the storage capacitance.

One or more embodiments may include at least one user circuit issuing task completion signals as a result of completion of user circuit tasks, and wherein the radiofrequency harvester may be coupled to the at least one user circuit and receptive of the task completion signals therefrom, the radiofrequency harvester configured to switch from burst phase operation to charge phase operation as a result of user circuit task completion signals received from the at least one user circuit.

In one or more embodiments, the at least one user circuit includes a sensor, wherein the user circuit task includes acquisition of sensor data.

In one or more embodiments the at least one user circuit may include at least one of a controller and a communication interface.

In one or more embodiments the communication interface may include one of a radio frequency, BlueTooth or Wi-Fi interface.

BRIEF DESCRIPTION OF THE DRAWINGS

One or more embodiments will now be described, by way of example only, with reference to the annexed figures, wherein:

FIG. 2 is a diagram exemplary of possible "Charge-and-Burst" operation of such an arrangement, FIG. 3 is a diagram exemplary of possible operation of embodiments, and FIG. 4 is a diagram providing a direct comparison of the diagrams of FIGS. 2 and 3.

DETAILED DESCRIPTION

Figure 1:
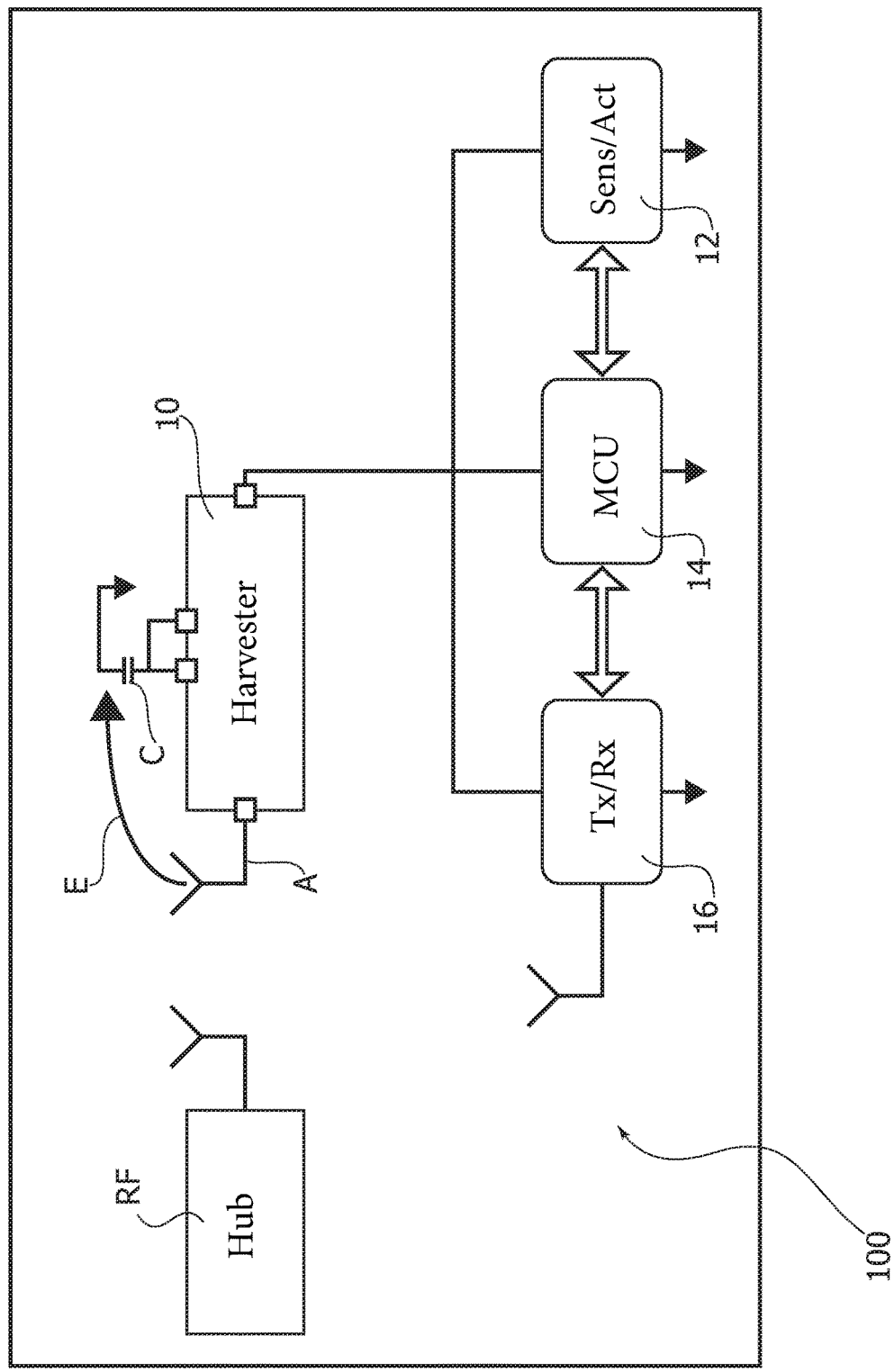
FIG. 1 is a block diagram exemplary of a wirelessly-powered device.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Reference 100 in FIG. 1 denotes as a whole a wirelessly-powered device such as a sensor node for use, for example in a wireless sensor network—WSN. Reference to that possible field of application is merely exemplary and non-limiting of embodiments.

The exemplary device 100 of FIG. 1 includes: a sensor/actuator (Sens/Act) 12, an associated processing unit (such as a microcontroller MCU circuit) 14, and a communication circuit (Tx/Rx) 16 such as a radio-frequency (RF), BlueTooth (BT) or Wi-Fi transmitter and/or receiver permitting transmission and/or reception of signals/data from and/or to the module 100.

The architecture presented in FIG. 1 is merely exemplary of possible fields of use of one or more embodiments and is not to be construed, even indirectly, in a limiting sense of embodiments.

Reference 10 in FIG. 1 indicates a so-called "harvester" circuit (of a type known per se) adapted to capture—for instance by means of an antenna A—radio frequency (RF) power emitted by an RF power transmitter (for instance a hub node in a wireless sensor network—WSN), with the RF power harvested via the harvester circuit 10 possibly representing the sole supply source of the various "user" circuits (for example circuits 12, 14, 16) included in the unit 100.

For that reason, the device 100 may be referred to as a wirelessly-powered or battery-free device.

It will be otherwise appreciated that the exemplary device 100 of FIG. 1 may also include a conventional supply source such as for example a battery which may co-operate with the harvester 10 in supplying the various circuits in the unit 100. The following description will refer for ease of understanding to arrangements where no such battery is provided, so that the arrangement 10 can be regarded as a battery-free arrangement.

A conventional arrangement may provide for operation of the harvester 10 being controlled (for instance by the controller 14) in such a way to include the alternation of "Charge" and "Burst" states or phases.

As exemplified in FIG. 2, during a first "Charge" phase (over an interval t_Charge) only the harvester circuit 10 will be operational with the "user" circuits (possibly including the controller 14) switched-off.

During that phase, the collected energy (power integrated over time) as captured by the harvester circuit 10 for example via the antenna A is stored in a storage capacitance (capacitor) C.

As exemplified by portion a) of FIG. 2, the (first) charge phase may proceed until the voltage across the capacitor C reaches an upper threshold Vmax.

The amount of energy stored in the capacitor C will thus be a function of the voltage Vmax and the value of the capacitance C. In turn, the voltage Vmax may be limited by the maximum allowed voltage for the harvester circuitry.

The capacitance value C can be chosen in such a way that the energy stored when the upper voltage reaches the upper threshold Vmax will permit the user circuits 12, 14, 16 to perform their assigned tasks during a subsequent "Burst" phase over an interval t_Burst.

In the burst phase the voltage on the storage capacitance C may drop as shown in the portion a) of FIG. 2 due to the negative balance of the harvested current and the operational current: the current being absorbed by the user circuits (for example circuits 12, 14, 16 in FIG. 1) will expectedly be higher than the being current harvested by the harvester circuit 10.

In an arrangement as exemplified in FIG. 2, such a burst phase will end when the voltage across the storage capacitance C reaches a lower value Vmin.

Such a lower value can be selected to correspond to the (lowest) voltage permitting operation of the user circuits 12, 14, 16 (or at least one or more of them) as desired.

Once the burst phase terminated, a new charge phase will be started as exemplified in FIG. 2.

Such a "new" charge phase from Vmin to Vmax will be generally shorter than the first charge phase from 0 to Vmax shown on the left-hand side of FIG. 2, and lead to a substantially regular alternation of charge and burst phases as schematically represented in FIG. 2 (right hand side).

In operation as exemplified in FIG. 2—see for example portion a)—the duration of the burst phases (that is, the interval t_Burst) will be substantially fixed in so far as that duration/interval will depend on the voltage difference Vmax−Vmin, the capacitance value of the storage capacitor C and the current consumption of the user devices (for example circuits 12, 14, 16), being otherwise independent of the actual time taken by the user circuits devices in performing their assigned tasks.

Such a time may be variable: for instance, in the case of a sensor arrangement, that time may depend on the type of acquisition performed by the sensor circuit 12 and may be indicated (for example by the microcontroller circuit 14) by issuing a corresponding signal (see for example the pulse designated t_Data_Ready in portion b) of FIG. 2).

An approach to facilitate adequate system performance according to the principle of operation exemplified in FIG. 2 may involve defining the value for t_Burst by referring to a "worst-case" scenario: that is, t_Burst may be selected to correspond to the longest expected time of operation of the user circuits 12, 14, 16.

This may result in selecting for t_Burst a value leading the voltage across the storage capacitor C to drop below the level which would be sufficient to support adequate operation of the circuits 12, 14, 16. As a consequence, the subsequent charge phase will be prolonged, with a negative impact on the "repetition time", that is the period (frequency) at which for example the sensing information can be acquired at circuit 12 and (possibly) processed at circuit 14.

In fact, the repetition time (frequency) may be negatively affected in at least two aspects:

the duration t_Burst of the burst phase selected in order to be able to handle "worst case" condition may be (unnecessarily) longer than the time after which the pulses t_Data_Ready will in most instances be issued: in fact, only a few cases will expectedly correspond to the "worst case"; and the corresponding larger voltage drop between Vmax and Vmin will result in a longer duration of the charge phases to restore the upper value Vmax.

Such a situation is evidenced in portion b) of FIG. 2 by showing that, in an arrangement where t_Burst is essentially fixed, operation of the user circuits (for example circuits 12, 14, 16) may be finalized (for example with sensor data collected at circuit 12, possibly processed at circuit 14 and transmitted at circuit 16) within an interval t_Data_Ready which may be shorter (and oftentimes much shorter) than t_Burst.

In one or more embodiments as exemplified in FIG. 3 operation of an arrangement as exemplified in FIG. 1 may be controlled (for example via the controller circuit 14) in such a way that, once the upper level Vmax is reached (during the "first" charge phase, designated C0) the alternation of burst phases B1, B2, . . . and charge phases C1, C2, . . . is no longer dictated by the voltage level stored across the capacitor C reaching the lower threshold value Vmin but rather by the t_Data_Ready signals (for example in the form of pulses) from the user circuits 12, 14, 16.

In that way, the user circuits (for example the controller circuit 14) may "inform" the harvester circuit 10 that their processing task(s) has been completed.

This type of operation is exemplified in the two portions a) and b) of FIG. 3 (plotted against a same abscissa time scale) where the burst phases B1, B2, . . . are terminated and the subsequent charge phases C1, C2, . . . started as a result of the user circuits 12, 14, 16 having completed their assigned tasks.

In that way, power supply can be discontinued until the circuits 12, 14, 16 are activated again (in a manner known per se, for example via a prompt signal issued by the controller 14 in a watch state) without energy being unnecessarily drawn from the storage capacitance C.

While the diagram of FIG. 3 refers for simplicity to intervals t_Data_Ready (and burst phases B1, B2, . . . ) of same durations, such intervals/phases may in fact have different durations and thus vary "adaptively" on an event-by-event basis, so that the burst phases B1, B2, . . . (and, correspondingly the charge phases C1, C2, . . . ) may have durations varying over time.

The two portions, labeled a) and b), respectively, of FIG. 4 provide a direct comparison—based on a same abscissa time scale—of:

operation as exemplified in FIG. 2—upper portion a) of FIG. 4, and operation as exemplified in FIG. 3—lower portion b) of FIG. 4.

As shown in the upper diagram in FIG. 4, operation as exemplified in FIG. 2 may result in a waste of time and energy as highlighted at W.

One or more embodiments as exemplified in FIG. 3 and in the lower portion of FIG. 4 may permit to improve speed of operation of the device (a higher number of operation cycles of the user circuits 12, 14, 16 can be performed in a same time span) while also improving energy efficiency (with less energy used for a same amount of tasks such as for example acquisition tasks as performed by the user circuits 12, 14, 16).

A method according to one or more embodiments may include:

providing a radiofrequency power harvester (for example circuit 10) storing captured radiofrequency energy (power integrated over time) in a storage capacitance (for example capacitor C) with at least one user circuit (for example circuits 12, 14, 16) supplied with energy stored in the storage capacitance, operating the harvester in alternated charge phases (for example charge phases C0, C1, C2, . . . ) and burst phases (for example burst phases B1, B2, . . . ) with captured radiofrequency energy stored in the storage capacitance in the charge phases and energy stored in the storage capacitance supplied to the at least one user circuit in the burst phases to perform user circuit tasks, detecting (for example t_Data_Ready) completion of the user circuit tasks in the burst phases, terminating the burst phases and alternating therefore charge phases as a result of completion of the user circuit tasks detected.

One or more embodiments may include:

the at least one user circuit issuing task completion signals as a result of completion of the user circuit tasks, switching operation of the radiofrequency harvester from burst phase operation to charge phase operation as a result of the user circuit task completion signals being issued.

In one or more embodiments, a circuit (for example circuit 100) may include:

a radiofrequency power harvester including a storage capacitance of radiofrequency energy captured by the radiofrequency power harvester, the storage capacitance couplable with at least one user circuit to supply thereto energy stored in the storage capacitance, wherein:

the harvester is operable in alternated charge phases and burst phases to store captured radiofrequency energy in the storage capacitance in the charge phases and supply energy stored in the storage capacitance to the at least one user circuit in the burst phases to perform user circuit tasks, the harvester is sensitive to completion of the user circuit tasks in the burst phases and configured to terminate the burst phases and alternate therefore charge phases as a result of completion of the user circuit tasks.

In one or more embodiments, a device may include:

a circuit according to one or more embodiments, at least one user circuit couplable to the storage capacitance in the burst phases to be supplied with energy stored in the storage capacitance.

One or more embodiments may include at least one user circuit issuing task completion signals as a result of completion of user circuit tasks, and wherein the radiofrequency harvester (10) may be coupled to the at least one user circuit and receptive of the task completion signals therefrom, the radiofrequency harvester configured to switch from burst phase operation to charge phase operation as a result of user circuit task completion signals received from the at least one user circuit.

In one or more embodiments, the at least one user circuit includes a sensor, wherein the user circuit task includes acquisition of sensor data.

In one or more embodiments the at least one user circuit may include at least one of a controller and a communication interface.

In one or more embodiments the communication interface may include one of a radio frequency, BlueTooth or Wi-Fi interface.

Without prejudice to the underlying principles, the details and embodiments may vary, even significantly, with respect to what has been described by way of example only, without departing from the extent of protection.

The extent of protection is defined by the annexed claims.

The invention claimed is:

1. A method for operating a radiofrequency power harvester configured to store captured radiofrequency energy in a storage capacitance for powering at least one user circuit supplied with energy stored in the storage capacitance, comprising:

alternating operation of the harvester between charge phases and burst phases wherein each of the charge phases causes the captured radiofrequency energy to be stored in the storage capacitance until the energy stored rises to a first threshold in response to which an immediately subsequent burst phase begins and wherein each of the burst phases causes the energy stored in the storage capacitance to be supplied to the at least one user circuit to perform user circuit tasks until the energy stored falls to a second threshold in response to which an immediately subsequent charge phase begins;

detecting completion of the user circuit tasks in a given burst phase;

even when the energy stored has not reached the second threshold, terminating the given burst phase in response to the detected completion of the user circuit tasks; and starting the immediately subsequent charge phase following the given burst phase in response to termination of the given burst phase.

2. The method of claim 1, further comprising:

issuing by the at least one user circuit a task completion signal as a result of the completion of the user circuit tasks; and switching operation of the radiofrequency harvester from the given burst phase to the immediately subsequent charge phase in response to the issued task completion signal.

3. A radiofrequency power harvester circuit that is configured to store captured radiofrequency energy in a storage capacitance for supply to a user circuit, wherein the harvester operates in alternating charge phases and burst phases, wherein each of the charge phases causes the captured radiofrequency energy to be stored in the storage capacitance until the energy stored rises to a first threshold in response to which an immediately subsequent burst phase begins and wherein each of the burst phases causes the energy stored in the storage capacitance to be supplied to the user circuit until the energy stored falls to a second threshold in response to which an immediately subsequent charge phase begins, and wherein the harvester responds to a signal indicating completion of user circuit tasks in a given burst phase by terminating the given burst phase, even when the energy stored has not reached the second threshold, and starting the immediately subsequent charge phase.

4. A device, comprising:

a radiofrequency power harvester configured to store captured radiofrequency energy in a storage capacitance;

at least one user circuit configured to receive energy stored in the storage capacitance and perform user circuit tasks;

wherein the harvester operates in alternating charge phases and burst phases, wherein each of the charge phases causes the captured radiofrequency energy to be stored in the storage capacitance until the energy stored rises to a first threshold in response to which an immediately subsequent burst phase begins and wherein each of the burst phases causes the energy stored in the storage capacitance to be supplied to the at least one user circuit to perform the user circuit tasks until the energy stored falls to a second threshold in response to which an immediately subsequent charge phase begins; and wherein the harvester responds to a detected completion of the user circuit tasks in a given burst phase, even when the energy stored has not reached the second threshold, by terminating the given burst phase and starting the immediately subsequent charge phase.

5. The device of claim 4, wherein the at least one user circuit is configured to issue a task completion signal, and wherein the radiofrequency harvester is configured to receive the task completion signal and operate in response thereto to switch from the given burst phase to the immediately subsequent charge phase.

6. The device of claim 4, wherein the at least one user circuit includes a sensor circuit configured to acquire sensor data as the user circuit task.

7. The device of claim 4, wherein the at least one user circuit includes a controller circuit.

8. The device of claim 4, wherein the at least one user circuit includes a communication interface.

9. The device of claim 8, wherein the communication interface includes one of a radio frequency interface, a BlueTooth interface or a Wi-Fi interface.

* * * * *